United States Patent
Long et al.

(10) Patent No.: US 8,090,504 B2
(45) Date of Patent: Jan. 3, 2012

(54) FEEDBACK LOOP SYSTEM FOR PASSENGER SAFETY

(75) Inventors: David C. Long, Wappingers Falls, NY (US); Randall J. Werner, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 11/971,503

(22) Filed: Jan. 9, 2008

(65) Prior Publication Data

US 2009/0177357 A1 Jul. 9, 2009

(51) Int. Cl.
*B60R 21/01* (2006.01)
(52) U.S. Cl. .............. 701/45; 180/286; 340/457.1
(58) Field of Classification Search .......... 701/49, 701/45; 340/457.1, 568.1; 180/286
See application file for complete search history.

(56) References Cited

U.S. PATENT DOCUMENTS

| | | | | |
|---|---|---|---|---|
| 3,732,538 | A * | 5/1973 | Gillund et al. ............ 340/457.1 |
| 5,804,887 | A * | 9/1998 | Holzapfel et al. ............ 307/10.1 |
| 6,025,783 | A * | 2/2000 | Steffens, Jr. ............ 340/644 |
| 6,203,059 | B1 * | 3/2001 | Mazur et al. ............ 280/735 |
| 6,272,411 | B1 * | 8/2001 | Corrado et al. ............ 701/45 |
| 6,430,488 | B1 * | 8/2002 | Goldman et al. ............ 701/36 |
| 6,489,889 | B1 * | 12/2002 | Smith ............ 340/457 |
| 7,209,033 | B2 * | 4/2007 | Hofbeck et al. ............ 340/457.1 |
| 7,233,239 | B2 * | 6/2007 | Chitalia et al. ............ 340/457.1 |
| 7,422,283 | B2 * | 9/2008 | Patterson et al. ............ 297/250.1 |
| 7,446,652 | B2 * | 11/2008 | Hagenbuch ............ 340/457.1 |
| 7,714,737 | B1 * | 5/2010 | Morningstar ............ 340/667 |
| 7,735,920 | B2 * | 6/2010 | Hinze et al. ............ 297/250.1 |
| 7,830,246 | B2 * | 11/2010 | Hawkins ............ 340/457.1 |
| 2003/0112133 | A1 * | 6/2003 | Webb et al. ............ 340/436 |
| 2004/0135573 | A1 * | 7/2004 | Kaltenbach et al. ............ 324/207.24 |
| 2004/0140890 | A1 * | 7/2004 | Hartmann et al. ............ 340/457.1 |
| 2004/0227626 | A1 * | 11/2004 | Almaraz et al. ............ 340/457.1 |
| 2005/0061568 | A1 * | 3/2005 | Schondorf et al. ............ 180/268 |
| 2006/0163430 | A1 | 7/2006 | Cordina et al. |
| 2006/0224290 | A1 * | 10/2006 | Nakashima et al. ............ 701/49 |
| 2007/0096891 | A1 * | 5/2007 | Sheriff et al. ............ 340/457.1 |
| 2007/0205884 | A1 * | 9/2007 | Federspiel et al. ............ 340/457.1 |
| 2010/0283593 | A1 * | 11/2010 | Miller et al. ............ 340/447 |

* cited by examiner

*Primary Examiner* — Paul N Dickson
*Assistant Examiner* — James English
(74) *Attorney, Agent, or Firm* — DeLio & Peterson, LLC; Kelly M. Nowak; Wenjie Li

(57) ABSTRACT

Methods, systems and apparatus for automatically ensuring passenger safety by identifying article(s) in need of securing in a vehicle and attaching at least one wireless signaling component to each article. Each wireless signaling component includes a wireless signaling device and a mechanical blocking device that controls a wireless signal emitted from the wireless signaling device. The emitted wireless signaling indicates a state of the article. State information relating to a state of each article is generated and received at a data network device, which generates state results based on this state information. The state results are output to an end user, whereby the state results identify those articles that are secured, unsecured, and/or improperly secured, for automatically ensuring passenger safety.

25 Claims, 5 Drawing Sheets

PASSENGER

1A ●

1B NP

2A

2B ●

3A NP

3B

3C ●

NP = NO PASSENGER
● = SEATBELT BUCKLED
 = SEATBELT UNBUCKLED
 = SEATBELT IMPROPERLY BUCKLED

FEEDBACK LOOP SYSTEM FOR PASSENGER SAFETY

BACKGROUND OF THE INVENTION

1. Field of the Invention

The present invention is directed to methods, systems and apparatus for automatically ensuring that articles within a vehicle are in a secured position during movement of the vehicle.

2. Description of Related Art

There are currently numerous types of vehicles or means of transportation that carry passengers. For instance, various types of ground transportation (e.g., automobiles, buses, trains, etc.), airplanes, amusement rides, child car seats, strollers, child ride-on toys, and the like are in existence. In all of these types of vehicles or means of transportation, there is at least one or more article that must be secured during movement of the vehicle for ensuring the safety of its passengers. For example, it is preferred that seatbelts are securely fastened, trays are properly stowed, overhead luggage compartments are latched, seats are in upright positions, etc, all during movement of the vehicle.

Securely fastened seatbelts are essential for ensuring passenger safety in various means of transportation or vehicles. For instance, lap seatbelts are often used in various types of ground transportation, airplanes, amusement rides and the like, while harness restraint seatbelts are also used in various means of ground transportation as well as child car seats, strollers, amusement rides, and the like. In all of these modes of transportation, or moving devices, it is essential to ensure that the seatbelt is securely fastened and in proper use for retaining passengers in seats, particularly, during movement of the vehicle.

However, a significant problem with the use of seatbelts, as well as all other articles that are preferably in a secured position for ensuring passenger safety, is that the driver, operator or attendants of these means of transportation or vehicles cannot continually ensure and monitor that such articles are in a safe and secured position. For instance, the driver, operator or attendants cannot continually ensure and monitor that all passengers have their seatbelts fastened, and that such fastened seatbelts are properly secured about the passenger.

It becomes even more difficult when the means of transportation carries many passengers, such as, for example, a commercial aircraft, bus, train, etc. For instance, in a commercial aircraft a typical activity of a flight attendant is to monitor the status of each passenger's seatbelt, in addition to making sure that trays are properly stowed, overhead luggage compartments are latched and seats are in upright positions. At many points during the flight (e.g., prior to take-off, during turbulence, or prior to landing), the flight attendant may need to make these status checks by walking up and down the aisle to inspect every passenger on board to ensure that their seats are upright and seatbelts properly fastened, that the trays are stowed, and the luggage compartments are latched. This is not only burdensome and time consuming for the flight attendant, but it may also disturb passengers, particularly, if a passenger is sleeping or resting.

As another example, it is also often difficult for an automobile driver to ensure that articles therein are in secured positions during movement of the automobile. A typical article that is difficult to monitor is the status of seatbelts within the automobile, particularly, whether or not those seats having passengers have properly fastened seatbelts. This is especially the case when the passengers are children, whom have a tendency to unfasten their seatbelts to get out of their seats or even climb out of their seats leaving the seatbelt still fastened during movement of the automobile. This type of activity is not only dangerous for the passenger, it is also distracting to the driver, leading to an increased risk of an accident that could potentially injure all passengers in the automobile, as well as passengers of other automobiles and bystanders.

Typical solutions for ensuring that articles within a vehicle are in a secured position during movement of the vehicle include manual inspection and electrically wired detection systems. Manual inspection is undesirable since it is time consuming and inefficient. Electrically wired detection systems are also undesirable since they are expensive, require electrical wiring running from every detection device to a control system, as well as require increased maintenance, and as such, increased downtime.

For instance, a typical solution for ensuring that seatbelts are fastened in a vehicle is having a sensor in the seatbelt electrically wired to a display unit of the vehicle located on the vehicle's dashboard. The display unit indicates whether the seatbelt is fastened or not fastened. However, in these systems, the seatbelts that are electrically wired are limited to the front seat seatbelts, and do not indicate the status of any rear seat seatbelts. The status of rear seat seatbelts becomes even more problematic when a child car seat or booster seat is used since these types of seats are not electrically wired to the electrically wired detection systems. A further problem is the need for running the electrical wiring from every seatbelt to the vehicle display unit. This would be time consuming and expensive, particularly when such electrical wiring would need to be installed in already existing vehicles that carry a large number of passengers.

Another concern with secured articles in a moving vehicle is verifying that such secured articles are in fact properly secured. For example, a concern with fastened seatbelts is ensuring or verifying that such fastened seatbelts are properly positioned on or about the passenger's body. While systems exist to detect whether or not an article is secured during movement of the vehicle, the prior art is deficient in systems that also verify that such secured articles are properly secured. For instance, while systems exist to monitor the status of a seatbelt (i.e., whether or not it is fastened), the prior art is deficient in systems that also verify that a fastened seatbelt is in fact properly fastened on or about a passenger's body.

Accordingly, it would be beneficial to provide methods, systems and apparatus for automatically ensuring that articles within a vehicle are in a secured position during movement of the vehicle to ensure the safety of those passengers riding in the vehicle.

SUMMARY OF THE INVENTION

Bearing in mind the problems and deficiencies of the prior art, it is therefore an object of the present invention to provide methods, systems and apparatus for automatically ensuring that articles within a vehicle are in a secured position during movement of the vehicle.

It is another object of the present invention to provide methods, systems and apparatus for automatically verifying that secured articles within a moving vehicle are actually properly secured.

A further object of the invention is to provide methods, systems and apparatus that avoid the need for manually inspecting whether or not articles within a vehicle in need of securing are actually secured.

Another object of the invention is to provide methods, systems and apparatus that avoid the use of electrically wired detection systems for ensuring that articles within a vehicle are in a secured position.

It is yet another object of the present invention to provide methods, systems and apparatus for easily and affordably detecting and verifying the secured status of articles within a moving vehicle for ensuring passenger safety.

Still other objects and advantages of the invention will in part be obvious and will in part be apparent from the specification.

The above and other objects, which will be apparent to those skilled in the art, are achieved in the present invention, which in a first aspect, is directed to a method for automatically ensuring passenger safety. The method includes identifying at least one article in need of securing in a vehicle and attaching at least one wireless signaling device to the article. This wireless signaling device is capable of emitting a wireless signal that indicates a state of the article. A mechanical blocking device is also provided for controlling the wireless signal of the wireless signaling device. State information for the article is then generated, whereby this state information is received at a data network device to generate a state result. The state result indicates the state (i.e., whether it is secured, unsecured, or improperly secured) of the article. This state results are output to an end user for automatically ensuring passenger safety.

The wireless signal may be emitted from the wireless signaling device and received by a receiving device, such as, one or more distributed antenna. The receiving device then transmits the emitted wireless signal to the data network device for determining whether the article is in a secured or unsecured state. Further, the state results may be verified using a signal-reducing device, such as, a conductive component. This signal-reducing device is capable of absorbing a portion of the wireless signal emitted from the wireless signaling device to generate a reduced strength wireless signal, which indicates that the article is an improperly secured state. When no signal is received at the data network device for a particular article, the state results indicate that such article is in an unsecured state.

The invention is particularly useful when the vehicle contains a plurality of articles in need of securing therein. In this aspect, a plurality of wireless signaling devices are provided, whereby at least one wireless signaling device is attached to each of the plurality of articles in need of securing within the vehicle. A plurality of mechanical blocking devices are also provided, whereby at least one mechanical blocking device is attached to each of the plurality of articles. Wireless signals are then emitted from selected ones of the wireless signaling devices, whereby the mechanical blocking devices control these emitted wireless signals. Each of the plurality of articles generates state information. This state information includes full strength emitted wireless signals to indicate the article is in a properly secured state, reduced strength emitted wireless signals to indicate the article is in an improperly secured state, no signals being transmitted to indicate the article is in an unsecured state, and combinations thereof. All of the state information is then transmitted to the data network device for generating the state results, which are output to the end user.

In accordance with the invention, the article(s) in need of securing may be a seatbelt in need of fastening, whereby the state of the seatbelt indicates whether or not the seatbelt is fastened. Alternatively, the article(s) in need of securing may be a seat, car seat, booster seat, tray, overhead luggage compartment, attendant call button or even combinations thereof. These articles may reside in a motorized means of ground transportation, an aircraft, a watercraft, an amusement ride, a stroller or even a ride-on toy. The wireless signaling device may be a Radio Frequency Identification Device (RFID tag), a magnetic badge, radio connections or infrared. Further, the wireless signaling device(s) of the invention may be permanently or removably attached to the article, while the state results may be output to the end user either visually, auditorily, or even combinations thereof.

In a preferred embodiment, the wireless signaling device comprises an RFID tag and the mechanical blocking device comprises a moveable plate. In this aspect, the moveable plate controls the wireless signal emitted by the RFID tag by entirely covering the RFID tag to prevent the wireless signal from being emitted. It also controls the wireless signal by exposing the RFID tag for allowing the wireless signal be emitted from the RFID tag.

In other aspects, the invention is also directed systems, computer program products and program storage devices for implementing the methods of the invention for automatically ensuring passenger safety.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED
EMBODIMENT(S)

In describing the preferred embodiment of the present invention, reference will be made herein to FIGS. 1-5 of the drawings in which like numerals refer to like features of the invention.

The present invention 100 is directed to methods, systems and apparatus for automatically ensuring and verifying that articles in need of securing in a vehicle or means of transportation are in a secured, desired position for ensuring safety of its passengers. Hereinafter, the phrase "vehicle or means of transportation" will be referred to only as "vehicle," with the understanding that the term vehicle is meant to include any type of moving device that carries at least one passenger including, but not limited to, any type of ground transportation (e.g., bus, automobile, train, truck, trolley, etc.), aircraft, watercraft, amusement rides, strollers, toys, and the like. By providing the present automatic monitoring invention, a driver, operator or an attendant of the vehicle advantageously does not have to continually and manually inspect the status of every article in need of securing within the vehicle. The invention is easy to use and implement in existing vehicles, and eliminates the need for electrical wiring to detect whether or not an article is secured during movement of the vehicle.

Figure 1:
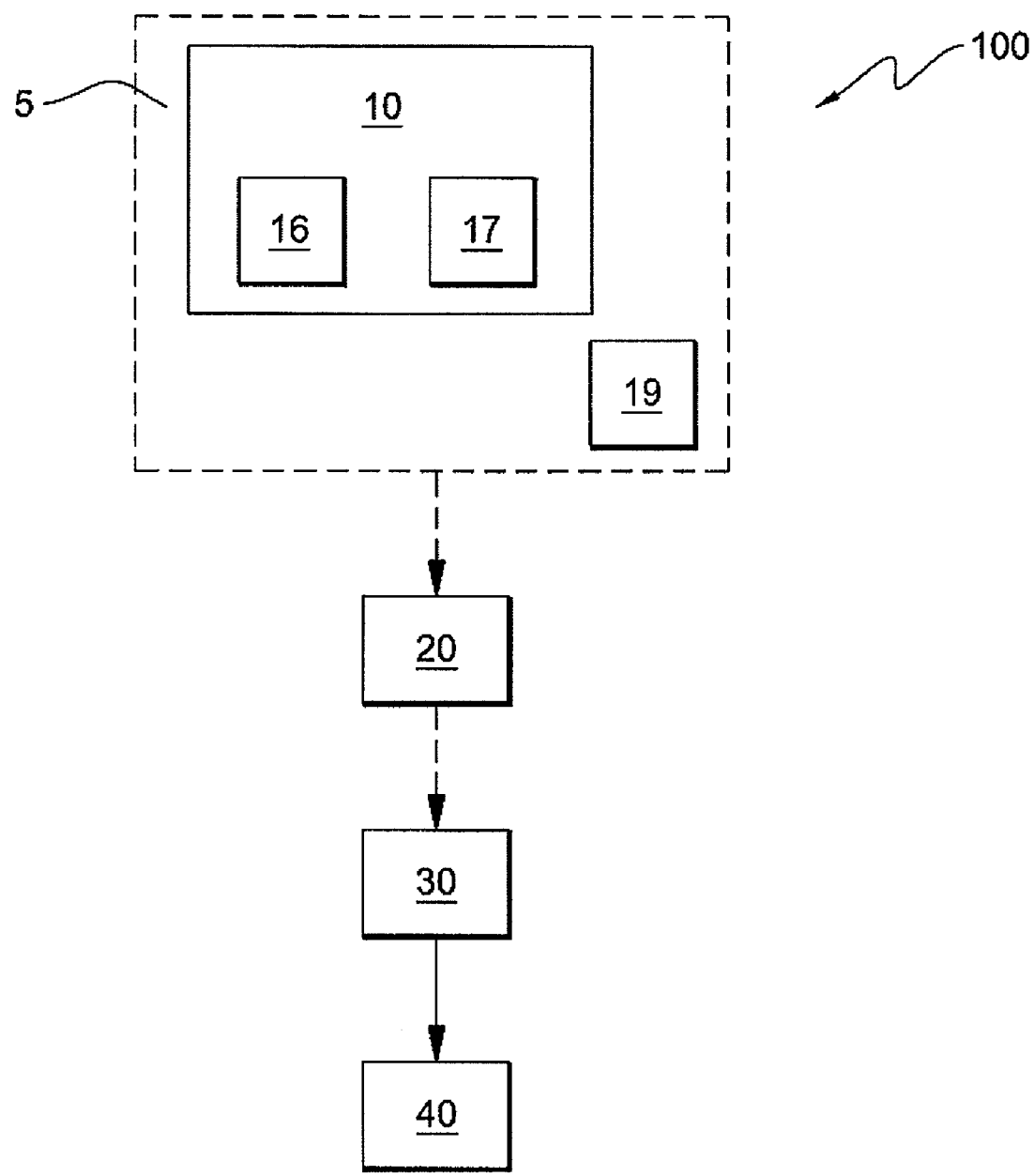
FIG. 1 is a simplified block diagram illustrating the components of the present automatic wireless monitoring system for ensuring passenger safety during vehicle movement.

Referring to FIG. 1, the present monitoring invention includes a wireless signaling component 10 attached to a portion of an article 5 in need of securing within a vehicle. While not limiting the invention, this article 5 in need of securing into a desired position may include, but is not limited to, a seatbelt in need of fastening, a car seat or booster seat in need of securing into a seat, a seat in need of being in the upright position, a tray in need of being properly stowed, overhead luggage compartments in need of being latched, and the like, and even combinations thereof. That is, multiple wireless signaling devices 10 may be attached simultaneously to a variety of different articles 5 in need of securing during vehicle movement.

In accordance with the invention, the article 5 may be a replacement article having the wireless signaling devices 10 permanently attached thereto for replacing a pre-existing similar article of the vehicle that does not have the wireless signaling component of the invention attached thereto. Alternatively, the wireless signaling components 10 may be detachable wireless signaling components that may be detachable affixed to and removed from pre-existing articles within the vehicle. This aspect may be particularly suitable for use with those articles (e.g., car seats, booster seats, strollers, toys, etc.) that are not easily replaceable or those that upon purchase do not have articles with the wireless signaling components 10 of the invention attached thereto.

The invention also includes a receiving device 20 for receiving information from the wireless signaling component(s) 10, a data network device 30 for receiving information from the receiving device 20 and a sensory device 40 linked to the data network device for outputting the state of the article(s) in need of securing (i.e., whether or not the article(s) in need of securing are actually secured during vehicle movement).

An essential feature of the invention is that each wireless signaling component 10 at least includes a wireless signaling device 16 and a mechanical blocking device 17. The wireless signaling component(s) 10 also include a signal-reducing device 19, as discussed further below. The wireless signaling component 10 may include a variety of different wireless signaling devices 16 that are attached to a portion of the article in need of securing (e.g., a seatbelt). These wireless signaling devices 16 may include, but are not limited to, a Radio Frequency Identification Device (RFID), a magnetic badge, radio connections, infrared or any other wireless device. For example, a radio connection that may be utilized includes, but is not limited to, Bluetooth®, and the like. Preferably, each wireless signaling device has the ability to identify the article to which it is attached, as well as its location within the vehicle, for distinguishing such article from other articles having wireless signaling devices in the vehicle.

Figure 2A:
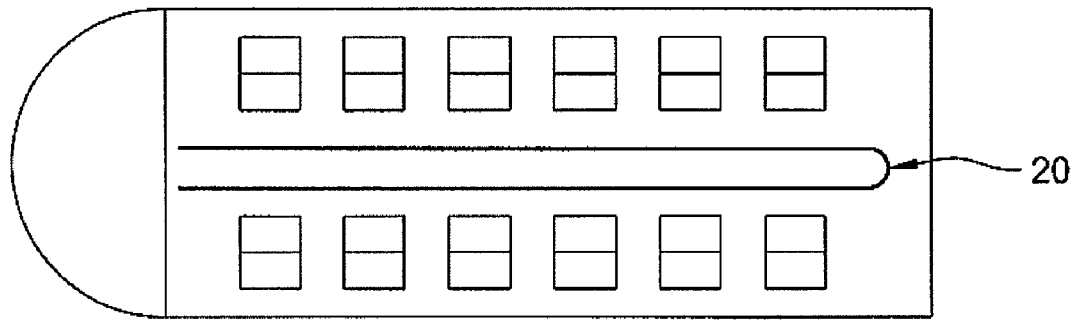
FIGS. 2A-2C show alternate embodiments for positioning the receiving device of the invention.
Figure 2B:
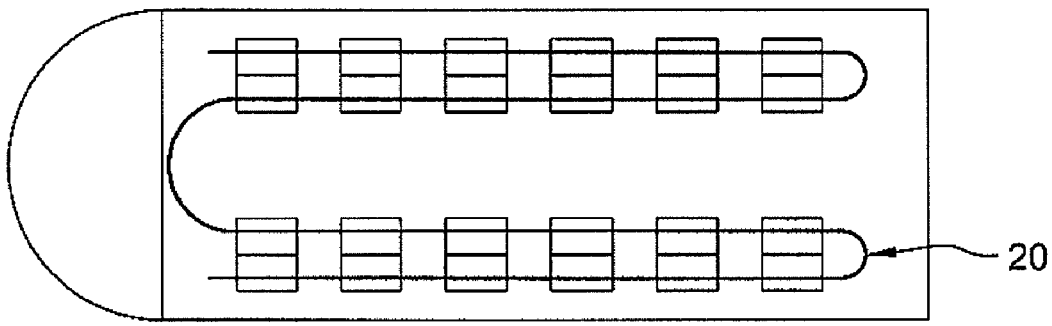
Figure 2C:
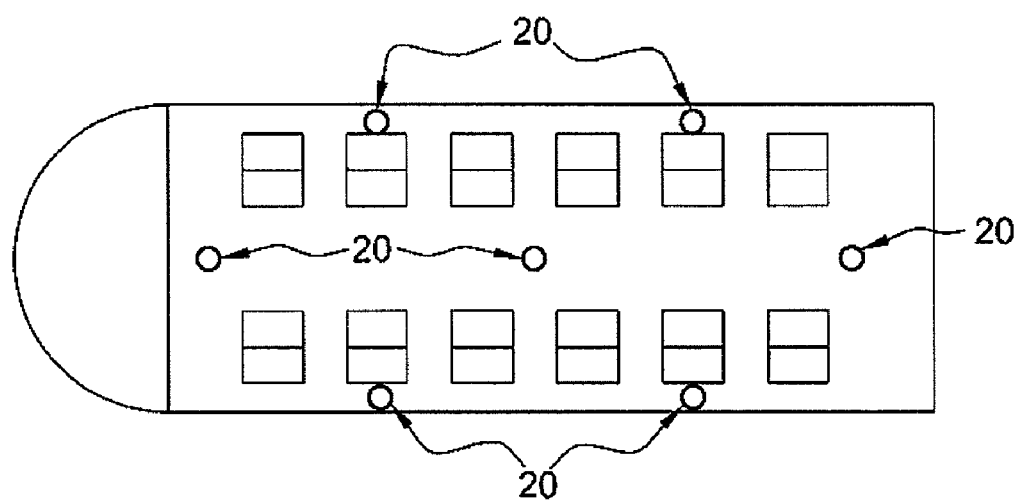

The receiving device 20 is preferably at least one or more distributed antenna adapted for receiving the type of emitted wireless signal. The distributed antenna, or antennas, is strategically positioned within the vehicle. For instance, referring to FIGS. 2A-2B, an antenna 20 may run the entire length of the vehicle (e.g., run the length of the seats, luggage compartments, roofs, etc.), around an inside perimeter of the vehicle, or it may be positioned at desired locations within the vehicle. For example, the antenna 20 may run down a middle isle or isles of the vehicle, be placed in the armrests of each seat or run along the interior roof of the vehicle. As an alternative, FIG. 2C shows that the antenna or a number of different antennas may be positioned at selected locations within the vehicle (this would be suitable for smaller passenger capacity vehicles, such as, an automobile.) As still another alternative, existing wiring within the vehicle may be used as the antenna. For example, the existing headphone wiring in the armrests of an airplane, when coupled to the RF circuits using inductive capacitance isolation and matching networks, would be sufficient for use as the antenna 20.

The data network device 30 has installed software of the invention for automatically determining whether or not an article in need of securing is in its desired, secured position, and for those articles indicated as being secured, verifying that such secured articles are actually in their desired, secured positions. In the preferred embodiment, the data network device 30 comprises a computer. The sensory device 40 is any type of device, or system, capable of outputting the state of the article(s) in need of securing to the driver, operator or attendant(s). For instance, the sensory device 40 may include, but is not limited to, a graphical user interface for visually displaying the state results, an auditory device for announcing the state results and even combinations thereof.

Figure 3A:
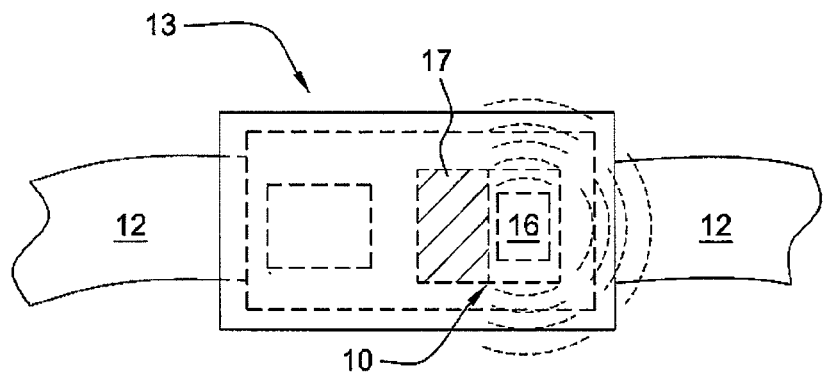
FIGS. 3A-3B show a preferred embodiment of the invention having a mechanically blocked/unblocked wireless signaling component attached to a seatbelt buckle for ensuring that a passenger is fastened within a seat during movement of the vehicle.
Figure 3B:
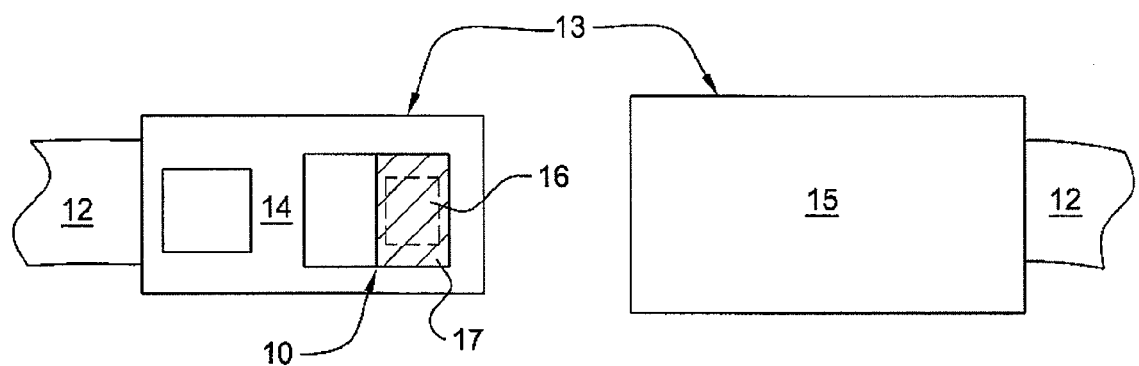

For ease of understanding the invention, and not to limit the scope thereof, FIGS. 3A and 3B show a preferred embodiment wherein the wireless signaling component 10 is attached to a seatbelt buckle for ensuring that a passenger is fastened within a seat during movement of the vehicle. However, it should be appreciated that the wireless signaling component may be attached to any article within the vehicle in need of securing during vehicle movement. The seatbelt may include any type of seatbelt including, but not limited to, a lap seatbelt, a three point harness, four point harness, five point harness, six point harness, and the like. Referring to FIGS. 3A and 3B, the seatbelt at least includes a buckle 13 portion and a strap 12 portion positioned around the passenger's body. The buckle 13 includes an insert element 14 and a receiving element 15 for securely receiving the insert element 14 to lock the buckle and fasten the strap of the seatbelt around the passenger's body. In so doing, the buckle 13 may either connect two strap portions 12 together, or it may connect a strap portion 12 to a receiving clasp attached to the seat, for securing the passenger in a seat.

In this preferred embodiment, the wireless signaling component 10 includes the wireless signaling device comprising a wireless signaling RFID tag 16 with the mechanical blocking device comprising a moveable mechanical blocking plate 17 that controls the signal emitted from the RFID tag 16. The wireless signaling device and blocking plate may be connected to either the insert element 14 or the receiving element 15 of the buckle. Preferably it is connected to the insert element. An essential feature of using the RFID tag is that it provides each seatbelt with a unique identification for distinguishing all of the vehicle's seatbelts from one another. In so doing, the unique identification provides a location where each seatbelt is located within the vehicle.

Referring to FIG. 3A, upon fastening the buckle, the insert element 14 is locked into the receiving element 15 whereby a portion of the receiving element 15 manipulates the mechanical blocking plate 17 thereby opening a window to expose the wireless signaling RFID tag 16. For example, a component of the receiving element may cause the mechanical blocking plate 17 to slide from one side of the wireless signaling component 10 to the other, thereby exposing the RFID tag. The exposed RFID tag 16 is then able to transmit a wireless signal (i.e., a radio frequency signal) in and out of the buckle. This wireless signal includes an identification the particular RFID tag is associated with a seatbelt and the exact location of such seatbelt within the vehicle. The receiving device(s) 20 receives this wireless signal emitted from the exposed RFID tag 16.

However, referring to FIG. 3B, when the seatbelt is unbuckled (i.e., not fastened), the mechanical blocking plate 17 retracts back to its stationary position to cover the RFID tag. This may be accomplished, for example, via a spring that pushes or pulls the blocking plate back to its stationary position. The mechanical blocking plate 17 will reside in this stationary position until the seatbelt is once again fastened. In the stationary position, the blocking plate entirely covers the RFID tag such that no signal is transmitted from the RFID tag 16. Accordingly, the blocking plate 17 is made of a material suitable for blocking the emitted wireless signals for preventing such signals from being received by the receiving device 20.

Seat occupancy information is also sent to the receiving device 20. In particular, while a seatbelt may be fastened, a passenger may not occupy the seat. The invention preferably detects each passengers' presence in particular seats, and cross-references this occupied seat information with those seats identified as having fastened seatbelts to verify that a passenger is in fact residing in the seat. Passenger seat occupancy is preferably detected using a wireless sensor located in the seat including, but not limited to, a RFID tag, a magnetic badge, radio connections, infrared or any other wireless device. The wireless sensor may also include an infrared sensor or thermal sensor directed at the passenger's body, which may or may not be located in the seat, for detecting the passenger's presence in the seat.

Preferably, a passenger's seat occupancy is detected using seat occupancy RFID tags in combination with moveable mechanical blocking plate, as described above. In so doing, each seat has a different RFID tag that uniquely identifies the particular seat, as well as identifies that the purpose of such RFID tag is for determining whether or not a person is sitting in the seat. Once a passenger sits down in the seat, the weight of the passenger manipulates the blocking plate to open a window that exposes the wireless RFID tag. The exposed seat occupancy RFID tag then transmits a wireless signal to the receiving device 20, whereby this wireless signal includes information identifying that the signal is for determining seat occupancy and contains information pertaining to whether or not a passenger is sitting in a particular seat. When a passenger is not sitting in a seat, the blocking plate covers the RFID tag, thereby preventing any wireless signals from being transmitted there-from.

Often a seatbelt may be fastened but the passenger may be sitting on the fastened seatbelt, or may have climbed out of the seatbelt. To overcome this problem, the invention advantageously verifies that a fastened seatbelt is properly positioned on or about a passenger's body. In so doing, a signal-reducing device 19, such as a conductive device, is provided to absorb a portion of the wireless signals emitted from the fastened seatbelt's RFID tag to provide a reduced wireless signal that is transmitted to the receiving device(s) 20. Wherein the RFID tag is affixed to the seatbelt, this signal-reducing device may include, but is not limited to, a conductive sheet positioned under the seat cushion, the seat shell itself if it is made of a conductive material (e.g., an aluminum seat shell), and the like. When the fastened seatbelt resides between the passenger's body and the signal-reducing device, with the absorption properties of the passenger's body, together the passenger's body and the signal-reducing device further absorb a portion of the wireless signals emitted from the fastened seatbelt's RFID tag to provide an even further reduced wireless signal.

Again, it should be appreciate that this invention is not limited to seatbelts and may include any type of article within a vehicle in need of securing for ensuring passenger safety. For instance, wireless signaling component(s) 10 (e.g., RFID tags having the mechanical blocking) may be affixed to the seats for ensuring that they are in upright positions, trays for ensuring that they are stowed, luggage compartments for ensuring that they are locked, car seats or booster seats for ensuring that the harness or seatbelt thereof is securely fastened as well as for ensuring that the car seat/booster seat itself is secured to the seat (i.e., two wireless signaling devices (RFIDs) may be affixed to a car seat/booster seat), etc. The invention may also be used in flight attendant call buttons for ensuring that they are properly pressed to call the flight attendant and depressed when the flight attendant is not needed.

In these types of articles, each wireless signaling device 16 may be activated by providing the article in its fully secured (i.e., locked) position for ensuring passenger safety. To verify that the articles are in their fully secured positions, the signal-reducing device 19 of the invention is affixed to the article 5 in close proximity to the wireless signaling component 10. In this aspect, the signal-reducing device 19 absorbs a portion of the signals emitted from the wireless signaling component 10 when the article is not in its fully secured position, thereby providing a reduced wireless signal that is transmitted to the receiving device(s) 20. However, when the article is in its fully secured position, the signal emitted from the wireless signaling component 10 is at its full strength (e.g., frequency).

Figure 4A:
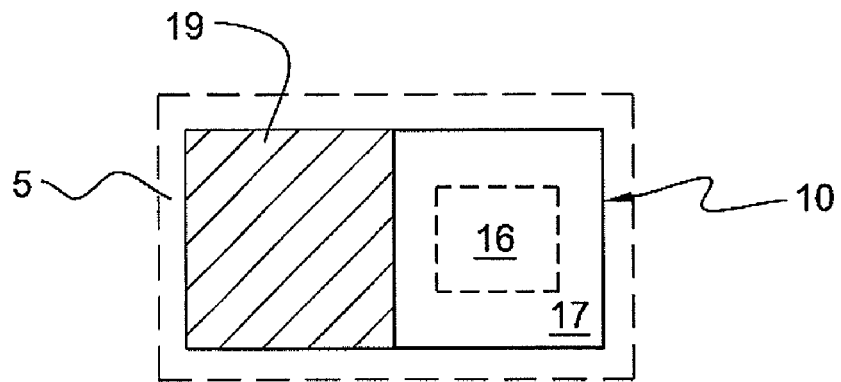
FIGS. 4A-4C show an alternate embodiment of the invention including the present mechanically blocked/unblocked wireless signaling component attached to an article in need of securing, in combination with a wireless signal reducing component for verifying that a secured article is actually secured.
Figure 4B:
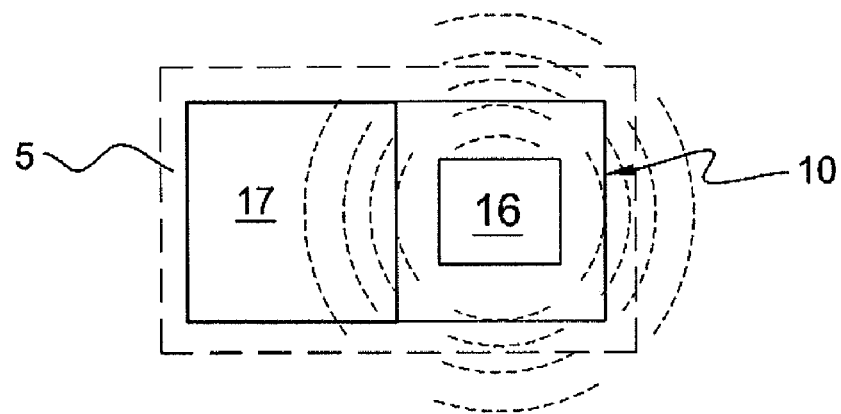
Figure 4C:
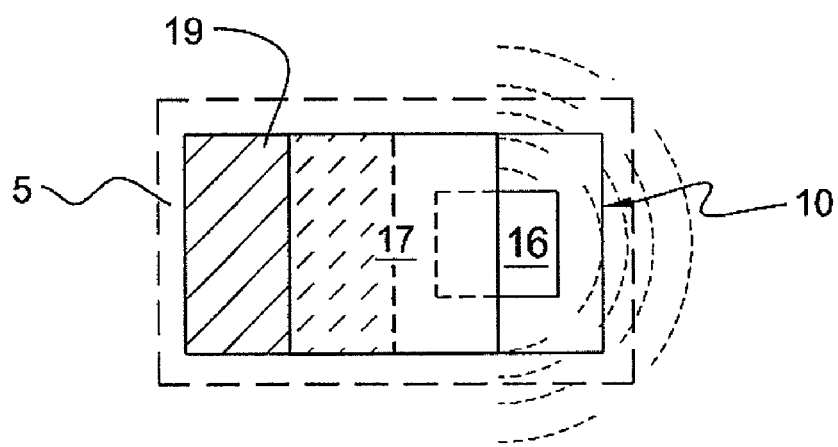

For example, referring to FIGS. 4A-C, each wireless signaling component 10 may include a RFID tag 16 with a moveable blocking plate 17. As shown in FIG. 4A, when the article 5 having the device 10 is in an unsecured position (i.e., unlocked), the blocking plate 17 covers the RFID tag while the signal-reducing device 19 is exposed. However, referring to FIG. 4B, when the article 5 is in a secured position (i.e., locked), the blocking plate covers the signal-reducing device 19 so that no signals emitted from the exposed RFID tag are absorbed. Now referring to FIG. 4C, when the article 5 is improperly secured (i.e., not fully locked), a portion of the signal-reducing device 19 will be exposed to absorb a portion of the signals emitted from the RFID tag to provide a reduced wireless signal. It should be appreciated that the signal-reducing device 19 may be located anywhere on the article 5 so long as it is capable of absorbing a portion of the wireless signals emitted from the wireless signaling component when the article is not properly or fully secured in a desired position for ensuring passenger safety during vehicle movement.

The receiving device(s) 20 then receive the wireless signals emitted from all of the wireless signaling devices 10. In so doing, the receiving device(s) 20 receive a plurality of different wireless signals that include an identification of the type of article 5 each wireless signaling device (e.g., RFID tag) is attached to and its location within the vehicle, as well as whether or not each of such items is in a secured position for ensuring passenger safety. The plurality of different wireless signals may be simultaneously and continuously transmitted to the receiving device(s) 20 for automatically updating the state of the article(s) in need of securing. Since all articles may not be in a secured state, the receiving device(s) will only receive a wireless signal from those wireless signaling devices (e.g., RFID tags) associated with secured articles, as well as any reduced strength wireless signals from those improperly secured articles (e.g., those articles that are not completely locked or seatbelts that are not secure about a passenger's body).

The receiving device(s) 20 then transmits the wireless digital information to the data network device 30 for analysis. Software running on the data network device 30 (e.g., a computer) analyzes this transmitted digital information. The software preferably includes an identification of each wireless signaling device (e.g., RFID tag) located within the vehicle for cross-referencing such data against the incoming information contained in each transmitted wireless signal. The software also includes information relating to the power (e.g., frequency in the case of RFID tags) at which the incoming wireless signals should be transmitted and received at the data network device 30. By comparing all of the incoming wireless digital information against the data network device's preset data, the data network device 30 is capable of identifying those wireless signaling components 10 that are transmitting a full signal, those transmitting a reduced signal, those transmitting no signal, and even combinations thereof. In so doing, the data network device determines whether or not each article having one or more wireless signaling component is in a secured position, and if so, verifying that such article is actually in a secured position for passenger safety.

For example, in the above-described embodiment of the invention, wherein the wireless signaling component is attached to a seatbelt, the transmitted wireless signal includes information relating to whether or not a seat is occupied and its seatbelt fastened. If so, the transmitted signal also includes information relating to whether or not such fastened seatbelt is properly secured around the passenger's body. The data network device 30 includes identifications for locations of each seat within the vehicle. As such, once the wireless signal is received, the data network device compares its preset data with the incoming wireless information to identify those seats occupied by passengers, and whether or not passengers in occupied seats have their seatbelts properly fastened and secured around their body. If the software does not receive a wireless signal from a particular article (i.e., seatbelt), then the software identifies the state of such article as being unsecured.

Figure 5:
FIG. 5 shows an example of the output results of the state of the articles in need of securing displayed to an end user of the invention.
Figure 5:
Figure 5:
Figure 5:

The results of the state of each article having a wireless signal are transmitted from the data network device 30 to a sensory device 40 for outputting these results to an end user (e.g., the driver, operator or attendant of the vehicle). The sensory device 40 may include, but is not limited to, a graphical user interface (GUI) for visually displaying the results, an auditory device for announcing the results, combinations thereof, and the like. While not meant to limit the invention, FIG. 5 shows an example of a GUI for visually displaying the state results of whether or not each article is in a secured position. The GUI easily and automatically indicates to the end user those articles that are in verified secured positions, those that are in improperly secured positions, and those articles that are not in secured positions. These status results of the state of each article may be output to the end user using a variety of different identifiers including, but not limited to, various color indicators, symbols, numbers and letters, as well as various sounds, and the like, and even combinations thereof.

After receiving the status results of the state of each article, an end user of the invention may then manually correct any articles in need of securing during movement of the vehicle. For example, after viewing the displayed results, the driver, operator or attendant(s) of the vehicle may then notify those passengers having unfastened or improperly fastened seatbelts for the fastening thereof, or even fasten such seatbelts themselves (e.g., in the instance of a car seat, booster seat, stroller, etc. having an unfastened or improperly fastened seatbelt). The end-user may also manually cross-reference the results of the state of each article with any seating assignments for eliminating the end user's task of continually and manually inspecting every article in the vehicle in need of securing during movement. The present invention advantageously continually updates the status data relating to the state of each article in need of securing (i.e., whether or not the article(s) in need of securing are actually secured during vehicle movement), preferably substantially in real time to provide the end user with the most current state data of each article.

It should be appreciated that the present invention may be embodied as a computer program product stored on a program storage device. The program storage devices of the present invention may be devised, made and used as a component of a machine utilizing optics, magnetic properties and/or electronics to perform the method steps of the present invention. Program storage devices include, but are not limited to, magnetic media such as a diskette or computer hard drive, magnetic tapes, optical disks, Read Only Memory (ROM), floppy disks, semiconductor chips and the like. A computer readable program code means in known source code may be employed to convert the methods described below for use on a computer.

While the present invention has been particularly described, in conjunction with a specific preferred embodiment, it is evident that many alternatives, modifications, and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for automatically ensuring passenger safety comprising:
    identifying at least one article in need of securing in a vehicle;
    attaching at least one wireless signaling device to said article, said wireless signaling device emitting a wireless signal that indicates a state of said article;
    providing a mechanical blocking device for controlling said wireless signal of said wireless signaling device;
    providing a signal-reducing device;
    generating state information for said article;
    receiving said state information at a data network device to generate a state result for said state of said article, said state result indicating if said article is in a secured state or an unsecured state;
    verifying whether said secured state comprises a properly secured state or an improperly secured state by said signal-reducing device absorbing a portion of said wireless signal to generate a reduced strength wireless signal which indicates that said article is in said improperly secured state; and
    outputting said state result to an end user to notify said end user that said article is in said unsecured state, properly secured state or improperly secured state for automatically ensuring passenger safety.

2. The method of claim 1 wherein said signal reducing device comprises a conductive component.

3. The method of claim 1 wherein said state information comprises no signal being received at said data network device, such that, said generated state result indicates that said article is in said unsecured state.

4. The method of claim 1 further including the steps comprising:
emitting said wireless signal from said wireless signaling device, said wireless signal comprising said state information;
receiving said emitted wireless signal at a receiving device;
transmitting said emitted wireless signal from said receiving device to said data network device;
determining whether said article is in said properly secured, unsecured or improperly secured state based on said emitted wireless signal to generate said state result; and
outputting said generated state result to said end user.

5. The method of claim 4 wherein said receiving device comprises one or more distributed antenna.

6. The method of claim 1 further including the steps comprising:
identifying a plurality of articles in need of securing within said vehicle;
attaching wireless signaling devices to each of said plurality of articles;
providing mechanical blocking devices for each of said wireless signaling devices;
providing signal-reducing devices for each of said wireless signaling devices;
emitting a plurality of wireless signals from select said wireless signaling devices, whereby said mechanical blocking devices control said plurality of emitted wireless signals;
generating said state information for each of said plurality of articles,
transmitting said state information to said data network device for generating state results for each of said articles;
outputting said state results to said end user for automatically ensuring passenger safety.

7. The method of claim 6 wherein said state information from said plurality of articles includes full strength emitted wireless signals to indicate said article is in said properly secured state, reduced strength emitted wireless signals to indicate said article is in said improperly secured state, no signals being transmitted to indicate said article is in said unsecured state, and combinations thereof.

8. The method of claim 1 wherein said article in need of securing comprises a seatbelt in need of fastening, whereby said state of said seatbelt indicates whether or not said seatbelt is fastened, and if said seatbelt is improperly fastened.

9. The method of claim 1 wherein said article in need of securing is selected from the group consisting of a seat, a child car seat, booster seat, tray, overhead luggage compartment and attendant call button.

10. The method of claim 1 wherein said vehicle is selected from the group consisting of a motorized means of ground transportation, an aircraft, a watercraft, an amusement ride, a stroller and a ride-on toy.

11. The method of claim 1 wherein said wireless signaling device is selected from the group consisting of a Radio Frequency Identification Device (RFID tag), a magnetic badge, radio connections and infrared.

12. The method of claim 1 wherein said wireless signaling device is permanently attached to said article.

13. The method of claim 1 wherein said wireless signaling device is removably attached to said article.

14. The method of claim 1 wherein said state result is output to said end user visually, auditorily, or combinations thereof.

15. The method of claim 1 wherein said at least one wireless signaling device comprises an RFID tag and said mechanical blocking device comprises a moveable plate, whereby said moveable plate controls said wireless signal emitted by said RFID tag by preventing said wireless signal from being emitted by entirely covering said RFID tag and allowing said wireless signal to be emitted by exposing said RFID tag.

16. A system for automatically ensuring passenger safety comprising:
at least one article in need of securing in a vehicle;
a wireless signaling component attached to said article comprising a wireless signaling device and a mechanical blocking device, said mechanical blocking device controlling a wireless signal emitted from said wireless signaling device;
a signal-reducing device for absorbing a portion of said wireless signal;
state information within said wireless signal;
a receiving device that receives said state information that identifies a state of said article;
a data network device that receives said state information from said receiving device, wherein said data network device analyzes said state information to generate a state result for said state of said article that indicates whether said article is in a secured state or an unsecured state, and if said article is in said secured state, further indicates whether said article is in a properly secured state or an improperly secured state; and
a sensory device for outputting said state result to an end user to notify said end user that said article is in said unsecured state, properly secured state or improperly secured state for automatically ensuring passenger safety.

17. The system of claim 16 wherein said signal-reducing device absorbs said portion of said wireless signal emitted from said wireless signaling device to generate a reduced strength wireless signal, which identifies in said state information that said article is said improperly secured state.

18. The system of claim 16 further comprising:
a plurality of articles in need of securing within said vehicle;
a plurality of wireless signaling components attached to said plurality of articles, said plurality of wireless signaling components comprising a plurality of wireless signaling devices and a plurality of mechanical blocking devices;
a plurality of signal-reducing devices for absorbing portions of said wireless signal; and
said receiving device receiving said state information from each of said plurality of wireless signaling components, said state information identifying the state of each of said plurality of articles.

19. The system of claim 18 wherein said state information from said plurality of articles includes full strength emitted wireless signals to indicate said article is in said properly secured state, reduced strength emitted wireless signals to indicate said article is in said improperly secured state, no signals being transmitted to indicate said article is in said unsecured state, and combinations thereof.

20. The system of claim 16 wherein said receiving device comprises one or more distributed antenna.

21. The system of claim 16 wherein said article in need of securing is selected from the group consisting of a seat, seatbelt, a child car seat, booster seat, tray, overhead luggage compartment and attendant call button.

22. The system of claim 16 wherein said wireless signaling device is selected from the group consisting of a Radio Frequency Identification Device (RFID tag), a magnetic badge, radio connections and infrared.

23. A computer program product comprising:
- a computer usable medium having computer readable program code means embodied therein for automatically ensuring passenger safety, the computer program product having:
- computer readable program code means for causing a computer to identify at least one article in need of securing in a vehicle;
- computer readable program code means for causing a computer to receive a wireless signal from a wireless signaling device attached to said article at a data network device, said wireless signal controlled by a mechanical blocking device also attached to said article, whereby said wireless signal indicates a state of said article in need of securing;
- computer readable program code means for causing a computer to receive a reduced signal from said wireless signal generated by a signal-reducing device;
- computer readable program code means for causing a computer to analyze said wireless signal at said data network device to generate a state result for said state of said article, said state result indicating if said article is in a secured state or an unsecured state;
- computer readable program code means for causing a computer to verify whether said secured state comprises a properly secured state or an improperly secured state by said signal-reducing device absorbing a portion of said wireless signal to generate a reduced strength wireless signal which indicates that said article is in said improperly secured state; and
- computer readable program code means for causing a computer to output said state result to an end user to notify said end user that said article is in said unsecured state, properly secured state or improperly secured state for automatically ensuring passenger safety.

24. A program storage device readable by a processor capable of executing instructions, tangibly embodying a program of instructions executable by the processor to perform method steps for automatically ensuring passenger safety, said method steps comprising:
- identifying at least one article in need of securing in a vehicle;
- receiving a wireless signal from a wireless signaling device attached to said article at a data network device, said wireless signal controlled by a mechanical blocking device also attached to said article, whereby said wireless signal indicates a state of said article in need of securing;
- analyzing said wireless signal at said data network device to generate a state result for said state of said article, said state result indicating if said article is in a secured state or an unsecured state;
- verifying whether said secured state comprises a properly secured state or an improperly secured state by a signal-reducing device absorbs a portion of said wireless signal to generate a reduced strength wireless signal which indicates that said article is in said improperly secured state; and
- outputting said state result to an end user to notify said end user that said article is in said unsecured state, properly secured state or improperly secured state for automatically ensuring passenger safety.

25. The method of claim 24 wherein said signal reducing device comprises a conductive component.

\* \* \* \* \*